United States Patent
Karaatanassov et al.

(10) Patent No.: US 11,303,691 B2
(45) Date of Patent: Apr. 12, 2022

(54) STREAMING PROGRESS UPDATES AND RESULTS OF REST API OPERATIONS

(71) Applicant: VMware, Inc., Palo Alto, CA (US)

(72) Inventors: Kiril Karaatanassov, Sofia (BG); Maya Ilieva, Sofia (BG)

(73) Assignee: VMware, Inc., Palo Alto, CA (US)

( * ) Notice: Subject to any disclaimer, the term of this patent is extended or adjusted under 35 U.S.C. 154(b) by 905 days.

(21) Appl. No.: 15/013,066

(22) Filed: Feb. 2, 2016

(65) Prior Publication Data

US 2016/0226946 A1 Aug. 4, 2016

Related U.S. Application Data

(60) Provisional application No. 62/111,001, filed on Feb. 2, 2015.

(51) Int. Cl.
| | |
|---|---|
| *H04L 29/08* | (2006.01) |
| *G06F 16/957* | (2019.01) |
| *H04L 67/02* | (2022.01) |
| *H04L 67/5681* | (2022.01) |

(52) U.S. Cl.
CPC ............ *H04L 67/02* (2013.01); *G06F 16/957* (2019.01); *H04L 67/2847* (2013.01)

(58) Field of Classification Search
CPC ..... H04L 67/02; H04L 67/2847; H04L 51/34; G06F 17/30899; G06F 16/957
USPC ................................................ 709/219, 224
See application file for complete search history.

(56) References Cited

U.S. PATENT DOCUMENTS

| | | | | |
|---|---|---|---|---|
| 6,185,306 | B1 * | 2/2001 | Mages | G06F 21/10 375/E7.025 |
| 8,959,482 | B2 * | 2/2015 | Bhogal | G06F 9/44505 717/120 |
| 2013/0031539 | A1 * | 1/2013 | Liverance | G06F 9/44 717/171 |
| 2014/0244721 | A1 * | 8/2014 | Taine | H04L 65/40 709/203 |
| 2014/0278724 | A1 * | 9/2014 | Compagna | G06Q 10/0633 705/7.27 |
| 2015/0033335 | A1 * | 1/2015 | Zhao | H04L 63/1416 726/22 |
| 2015/0074236 | A1 * | 3/2015 | Ulbricht | H04L 63/0853 709/219 |
| 2015/0156183 | A1 * | 6/2015 | Beyer | H04L 63/08 726/4 |

* cited by examiner

*Primary Examiner* — David R Lazaro
*Assistant Examiner* — Mariegeorges A Henry
(74) *Attorney, Agent, or Firm* — Patterson + Sheridan, LLP (57) ABSTRACT

One or more examples provide a method of performing a REST API operation at a server computing system includes receiving a request of a hypertext transfer protocol (HTTP) session from a client computing system. The request includes data for requesting performance of the REST API operation and issuance of progress updates. The method further includes sending a first part of a response of the HTTP session to the client computing system. The first part of the response acknowledges the request. The method further includes sending, while the REST API operation is performed, at least one additional part of the response to the client computing system, each additional part of the response having a progress update for the REST API operation. The method further includes sending, upon completion of the REST API operation, a final part of the response to the client computing system having a result of the REST API operation.

20 Claims, 5 Drawing Sheets

```
POST http://localhost:12345/rest/com/vmware/test-api-
operation?input=testString HTTP/1.1
Host: localhost:12345
Accept: multipart/x-mixed-replace, application/json
Content-Type: application/json
```
202

```
GET http://localhost:12345/rest/com/vmware/test-api-
operation?~method=POST&~progress=true&input=testString
```
204

302
```
HTTP/1.1 202 Accepted
Content-Type: multipart/x-mixed-
replace;boundary=975478f6-c9ab-44e3-a124-c0d02bb9fe3a
Transfer-Encoding: chunked
Date: Fri, 08 Mar 2013 17:24:10 GMT
Server: Apache
```

304-1
```
--975478f6-c9ab-44e3-a124-c0d02bb9fe3a
Content-Type: application/json

{"min":0,"max":10,"current":1}
```

304-2
```
--975478f6-c9ab-44e3-a124-c0d02bb9fe3a
Content-Type: application/json

{"min":0,"max":10,"current":5}
```

304-3
```
--975478f6-c9ab-44e3-a124-c0d02bb9fe3a
Content-Type: application/json

{"min":0,"max":10,"current":9}
```

306
```
--975478f6-c9ab-44e3-a124-c0d02bb9fe3a
Status: 200
Content-Type: application/json {"value":"testString"}
--975478f6-c9ab-44e3-a124-c0d02bb9fe3a--
```

FIG. 5 ions of the
STREAMING PROGRESS UPDATES AND RESULTS OF REST API OPERATIONS

CROSS-REFERENCE TO RELATED APPLICATIONS

This application claims priority to U.S. Provisional Application Ser. No. 62/111,001, filed Feb. 2, 2015, which is incorporated by reference herein in its entirety.

BACKGROUND

Many processes invoked through a remote application programming interface (API) cannot complete instantaneously. For example, in a typical representational state transfer (REST) architecture, a client sends a hypertext transfer protocol (HTTP) request to a server to invoke an operation that is part of a known API. The operations of the API vary in terms of time to completion from the request. Some API operations can be completed quickly ("quick running operations"), while other API operations can take longer to complete ("long running operations"). Further, assumptions about the duration of a particular API operation may change due to various factors such that a quick running operation can become a long running operation and vice versa. When the server completes the API operation, the server sends an HTTP response to the client with the result. In a REST architecture, the client and server are separated functionally so that the client does not have access to the internal resources of the server and vice versa. The client can only access the server through the REST API. Thus, while the server performs the API operation, there is typically no mechanism for the client to monitor the progress of the API operation. As such, the client must wait an indeterminate amount of time for the HTTP response from the server. The client must account for this indeterminate time of completion for each requested API operation, which can be inefficient.

SUMMARY

One or more embodiments provide techniques for streaming progress updates and results of representational state transfer (REST) application programming interface (API) operations. In some embodiments, a method of performing a REST API operation at a server computing system includes receiving a request of a hypertext transfer protocol (HTTP) session from a client computing system. The request includes data for requesting performance of the REST API operation and issuance of progress updates. The method further includes sending a first part of a response of the HTTP session to the client computing system. The first part of the response acknowledges the request. The method further includes sending, while the REST API operation is performed, at least one additional part of the response to the client computing system, each additional part of the response having a progress update for the REST API operation. The method further includes sending, upon completion of the REST API operation, a final part of the response to the client computing system having a result of the REST API operation.

Further embodiments include a non-transitory computer-readable storage medium comprising instructions that cause a computer system to carry out the above method, as well as a computer system configured to carry out the above method.

DETAILED DESCRIPTION

Streaming progress updates and results of representational state transfer (REST) application programming interface (API) operations is described. In various embodiments, a client can submit a request for progress updates along with a hypertext transfer protocol (HTTP) request invoking a REST API operation of a server. If the requested REST API operation supports progress updating, the server sends a first part of an HTTP response to the client acknowledging the request. In this manner, the client subscribes to the server to receive progress updates for the requested REST API operation. The server can then begin execution of the REST API operation. While the REST API operation is performed, the server can send at least one additional part of the response to the client over time, where each additional part includes a progress update for the REST API operation. As such, the client receives progress update(s) for the requested REST API operation per the established subscription. The client does not have to poll the server or issue any additional request in order to monitor the progress of the requested REST API operation. When the REST API operation is complete, the server sends a final part of the response to the client, which includes the result of the REST API operation.

A "part" of the HTTP response includes an encapsulation boundary and a body. The encapsulation boundary separates one part of an HTTP response from another. The body can include various data. In embodiments, the body of a part of an HTTP response includes a progress update. A "progress update" is data indicating progress of a particular REST API operation. Any type of data that specifies progress can be included in a progress update, such as percentage complete, percentage left to complete, time left to complete, time elapsed, or the like or any combination thereof.

Since the client receives progress updates for the REST API operation, the client can estimate the time of completion of the REST API operation. As the client receives progress updates from the server, the client can dynamically update the estimated time of completion. This allows the client to optimize its processes based on the estimated time of completion. Furthermore, the REST API of the server can be simplified by eliminating any explicitly published estimated durations of REST API operations. The server is thus not constrained by such explicitly published durations and is free to execute the requested REST API operations in an optimal manner.

Embodiments described herein provide a way for REST API contracts to be developed and used agnostic of the expected duration of API operations. An example is a Create Virtual Machine operation. Depending on the disk size and complexity, this operation can complete for less than 1 second or for 10 min. If the operation is designed as spontaneous operation, but it turns out to be a long running operation, the developer would need to change the contract. Then the client has to be changed as well. Embodiments described herein aim to ease the burden of API contract evolution by providing means to consume any API as long running from the start. These and further aspects are discussed below with respect to the following figures.

Figure 1:
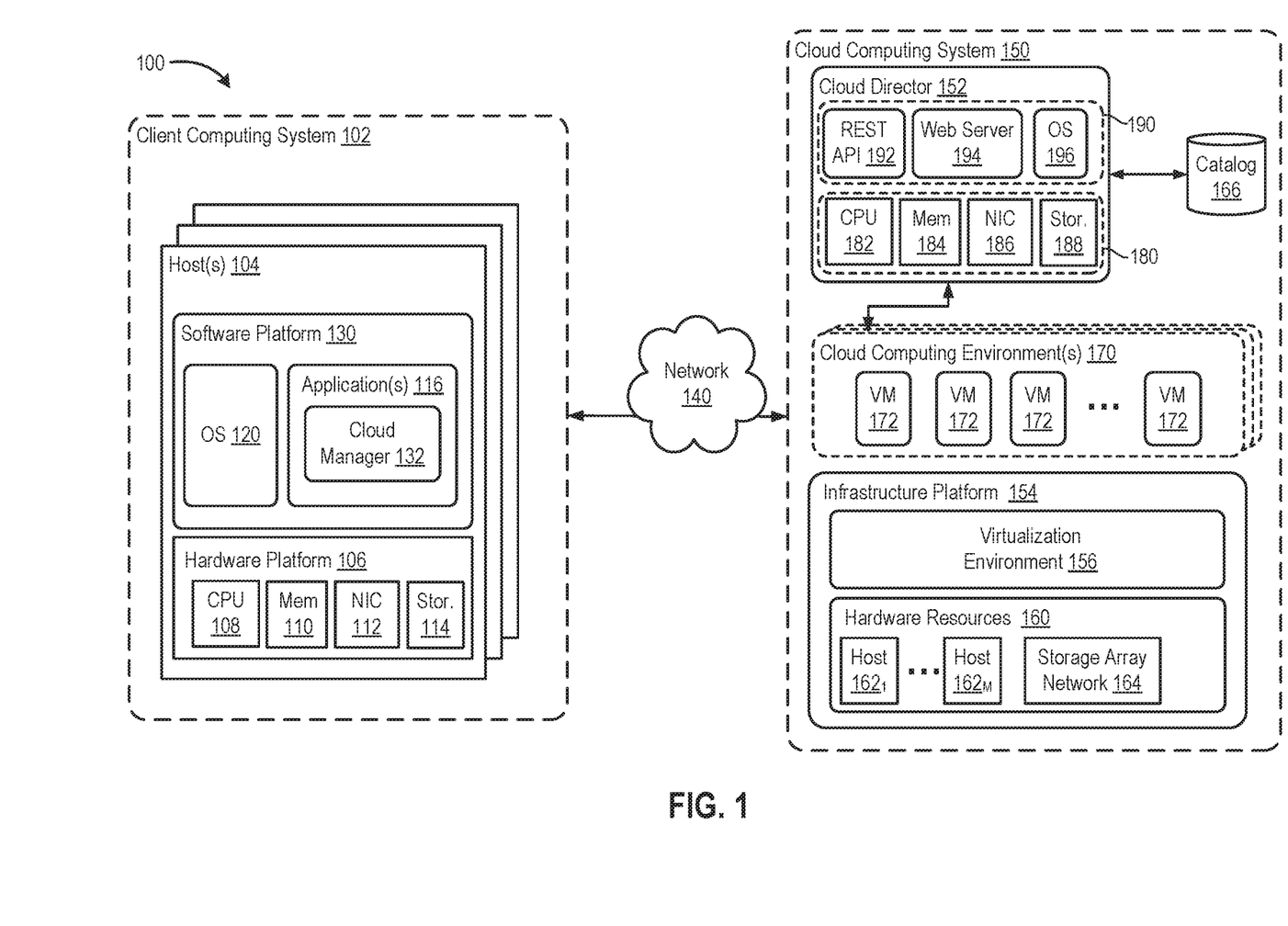
FIG. 1 is a block diagram of a computing system in which one or more embodiments of the present disclosure may be utilized.

FIG. 1 is a block diagram of a computing system 100 in which one or more embodiments of the present disclosure may be utilized. Computing system 100 includes a client computing system 102 and a cloud computing system 150. Client computing system 102 can communicate with cloud computing system 150 over a network 140. Client computing system 102 includes one or more host computer systems 104. Host computer system(s) 104 can include a hardware platform 106, such as a server, a desktop, a laptop, a tablet, a handheld device, or the like. Hardware platform 106 include conventional components of a computing device, such as one or more central processing units (CPUs) 108, system memory 110, a network interface 112, storage 114, and other input/output (TO) and support devices, such as a mouse, keyboard, and the like (not shown). Each of CPU(s) 108 is configured to execute instructions that perform one or more operations described herein. The instructions can be stored in system memory 110, storage 114, or any other memory in the hardware platform 106 (e.g., cache memory). System memory 110 includes device(s) that store information and can include, for example, random access memory (RAM), read-only memory (ROM), or a combination thereof. Network interface 112 can include one or more network adapters, as referred to as network interface cards (NICs). Storage 114 includes local storage devices, such as hard disks, flash memory modules, solid state disks, optical disks, and the like. Storage 114 can also include interface(s) configured for communication with one or more network data storage systems, such as host bus adapter(s) configured for communication with a storage array network (SAN) or network-attached storage (NAS), as well as other network data storage systems.

Host computer system(s) 104 can include a software platform 130 that includes an operating system (OS) 120 and one or more applications 116. Application(s) 116 can include various types of applications executable within the OS 120. In an example, application(s) 116 include a cloud manager 132. Could manager 132 is configured to carry out various tasks to manage virtual computing resources provided by cloud computing system 150. For example, cloud manager 132 can deploy virtual machines (VMs) in cloud computing system 150 or perform other administrative tasks with respect to VMs in cloud computing system 150. As described below, cloud computing system 150 can provide access to resources therein through a representational state transfer (REST) application programming interface (API) 192. Accordingly, cloud manager 132 can invoke operations in cloud computing system 150 supported by REST API 192.

Cloud computing system 150 includes an infrastructure platform 154 upon which cloud computing environment(s) 170 can be executed. Cloud computing environment(s) 170 include a plurality of virtual machines 172 configured to host various applications. Virtual machines 172 provide abstractions of processor, memory, storage, and networking resources. Infrastructure platform 154 includes hardware resources 160 and a virtualization environment 156. Hardware resources 160 include computing resources, storage resources, network resources, and the like. In the embodiment of FIG. 1, hosts 162 and SAN 164 are shown as example resources in hardware resources 160. Hardware resources 160 are configured in a manner to provide virtualization environment 156 that supports the execution of virtual machines 172 across hosts 162. Virtualization environment 156 can be implemented by running hypervisors on hosts 162, such as VMware ESX® based hypervisor technologies provided by VMware, Inc. of Palo Alto, Calif. (although it should be recognized that any other virtualization technologies, including Xen® and Microsoft Hyper-V® virtualization technologies may be utilized consistent with the teachings herein).

Cloud computing system 150 can also include a cloud director 152 that manages cloud computing environment(s) 170. Cloud director 152 maintains and publishes a catalog 166 of available virtual machine templates and packaged virtual machine applications that represent virtual machines that may be provisioned in cloud computing environment(s) 170. A virtual machine template is a virtual machine image that is loaded with a pre-installed guest operating system, applications, data, and is typically used to repeatedly create a VM having the pre-defined configuration. A packaged virtual machine application is a logical container of pre-configured virtual machine(s) having software components and parameters that define operational details of the packaged application. An example of a packaged VM application is vAPP™ technology made available by VMware, Inc., of Palo Alto, Calif., although other technologies can be used.

Cloud director 152 includes a hardware platform 180 and a software platform 190. Hardware platform 180 includes conventional components of a computing device, such as one or more central processing units (CPUs) 182, system memory 184, a network interface 186, storage 188, and the like. Cloud director 152 can be implemented as a VM using infrastructure platform 154, or using a dedicated computing system. As such, hardware platform 180 can be implemented as a virtual machine supported by virtualization environment 156 or can be dedicated hardware.

Software platform 190 includes REST API 192, a web server 194, and an OS 196. REST API 192 includes various REST API operations (also referred to as "API operations" or "operations") that can be invoked by client computing system 102 through communication with web server 194. API operations can include, for example, creation and management of VMs in cloud computing environment(s) 170. In embodiments, the API operations in REST API 192 are not constrained based on any expected duration (e.g., long running versus quick running), which allows the cloud director 152 to execute the API operations in an optimal manner. In embodiments, some or all of the API operations in REST API 192 support streaming of progress updates to client computing system 102 while the API operations are being performed. For example, cloud manager 132 can submit an HTTP request of an HTTP session to cloud director 152 to invoke an API operation in REST API 192 and to receive progress updates while the API operation is performed. Cloud director 152 can acknowledge the HTTP request in a first part of an HTTP response for the HTTP session, allowing cloud manager 132 to subscribe to the cloud director 152 to receive progress updates for the requested API operation. While the API operation is performed, cloud director 152 can send one or more progress updates to cloud manager 132 in additional part(s) of the HTTP response. When the API operation is complete, cloud director 152 can send a result of the API operation to cloud manager 132 in a final part of the HTTP response.

FIG. 1 shows one example of a computing system in which the techniques described herein can be used. In the embodiments described above, cloud manager 132 operates as a "client" and cloud director 152 operates as a "server" in a REST architecture. As is known in the art, REST is a software architecture for creating scalable web services. In a REST architecture, the functionality of the "client" is separated from the functionality of the "server". Communication between the client and server is through the REST API. In general, the techniques described herein can be used in any system having a similar REST architecture having one or more clients (client computing systems) communicating with one or more servers (server computing systems), each server implementing a REST API through which clients can invoke API operations. Each API operation can be any type of service, application, or the like that can be executed by the server on behalf of the client.

Figure 2A:
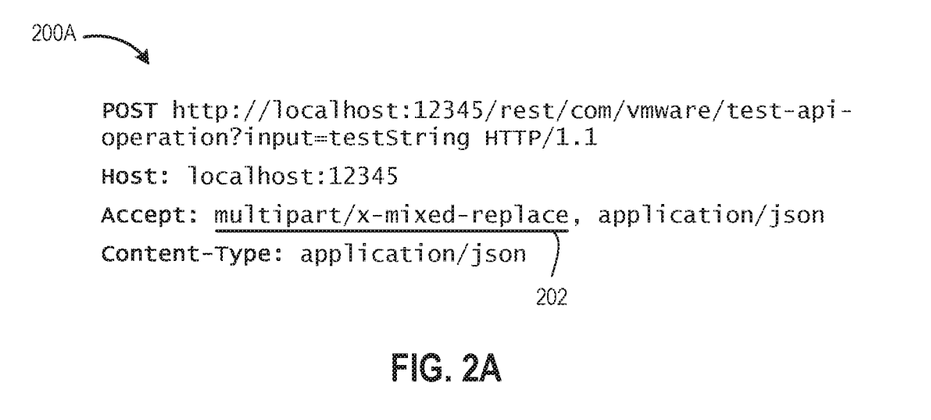
FIGS. 2A and 2B show example HTTP requests for invoking an API operation with progress updates.
Figure 2B:
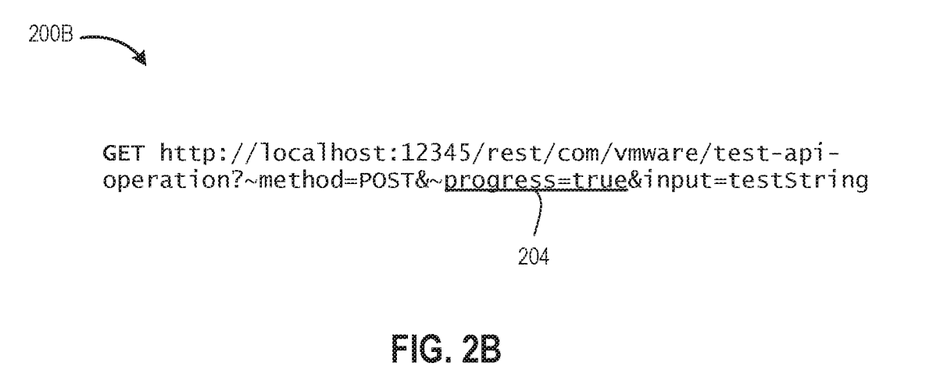

FIGS. 2A and 2B show example HTTP requests for invoking an API operation with progress updates. With respect to FIGS. 2A and 2B, the terms "client" and "server" are used to represent the originator of the HTTP request and the consumer of the HTTP request, respectively. In the example of FIG. 1, cloud manager 132 is the client and cloud director 152 is the server. Further, the HTTP request is part of an HTTP session that includes both the HTTP request and an HTTP response (described below).

As shown in FIG. 2A, an HTTP request 200A comprises an HTTP POST method having a uniform resource identifier (URI) and a plurality of headers. By way of example, "Host", "Accept", and "Content-Type" headers are shown. The URI specifies the requested API operation. In the present example, the URI specified "http ://localhost:12345/rest/com/vmware/test-api-operation?input=testString". Thus, a client invokes an API operation "/rest/com/vmware/test-api-operation" using an HTTP POST method with a parameter "input=testString". A "Host" header specifies "localhost: 12345" such that URI is sent to port "12345" of the server "localhost". A "Content-Type" header specifies a multi-purpose internet mail extensions (MIME)-type of the optional body of the HTTP request 200A (the body is omitted in the present example, but can include content in some embodiments). In the present example, the MIME-type "application/json" is specified indicating that the body of HTTP request 200A includes content in JavaScript Object Notation (JSON). While various examples herein describe the JSON content-type, it is to be understood that other content-types can be employed, such as extensible markup language (XML) and the like. An "Accept" header specifies that the client accepts the MIME-type "multipart/x-mixed-replace" and the MIME-type "application/json". The REST API of the server (e.g., REST API 192) is configured such that presence of the MIME-type "multipart/x-mixed-replace" in the "Accept" header of the HTTP request indicates a request by the client to receive progress updates for the API operation through a multipart HTTP response. Thus, the "Accept" header of HTTP request 200A includes a parameter 202 that requests issuance of progress updates for the API operation.

As shown in FIG. 2B, an HTTP request 200B comprises an HTTP GET method having a URI that specifies a uniform resource locator (URL). The URL specifies "http://localhost:12345/rest/com/vmware/test-api-operation?~method=POST&~progress=true&input=testString". Thus, similar to HTTP request 200A, HTTP request 200B invokes an API operation "rest/com/vmware/test-api-operation" with an input parameter "input=testString" on a server "localhost" through port "12345". In contrast to HTTP request 200A, HTTP request 200B does not include any specific header used to request progress updates, such as the "Accept" header discussed above. Rather, HTTP request 200B requests progress updates using a specific parameter "progress=true" in the URL. The REST API of the server (e.g., REST API 192) is configured such that presence of the parameter "progress=true" in the URI of the HTTP request indicates a request by the client to receive progress updates for the API operation. While HTTP request 200B is shown without headers or a body, it is to be understood that in some embodiments HTTP request 200B can include headers and/or a body.

While specific example HTTP requests are described above, other embodiments of HTTP requests that request performance of a REST API operation and issuance of progress updates are possible. In general, an HTTP request can be formed for invoking an API operation on a server that includes parameter(s), header(s), content in a body, or a combination thereof that requests issuance of progress updates. REST API of the server (e.g., REST API 192) can be configured to interpret pre-defined parameter(s), header(s), content in a body, or a combination thereof as a request for progress updates for the API operation. The specific URIs, URLs, content-types, and the like discussed above are examples and can be specified with any specified value.

Figure 3:
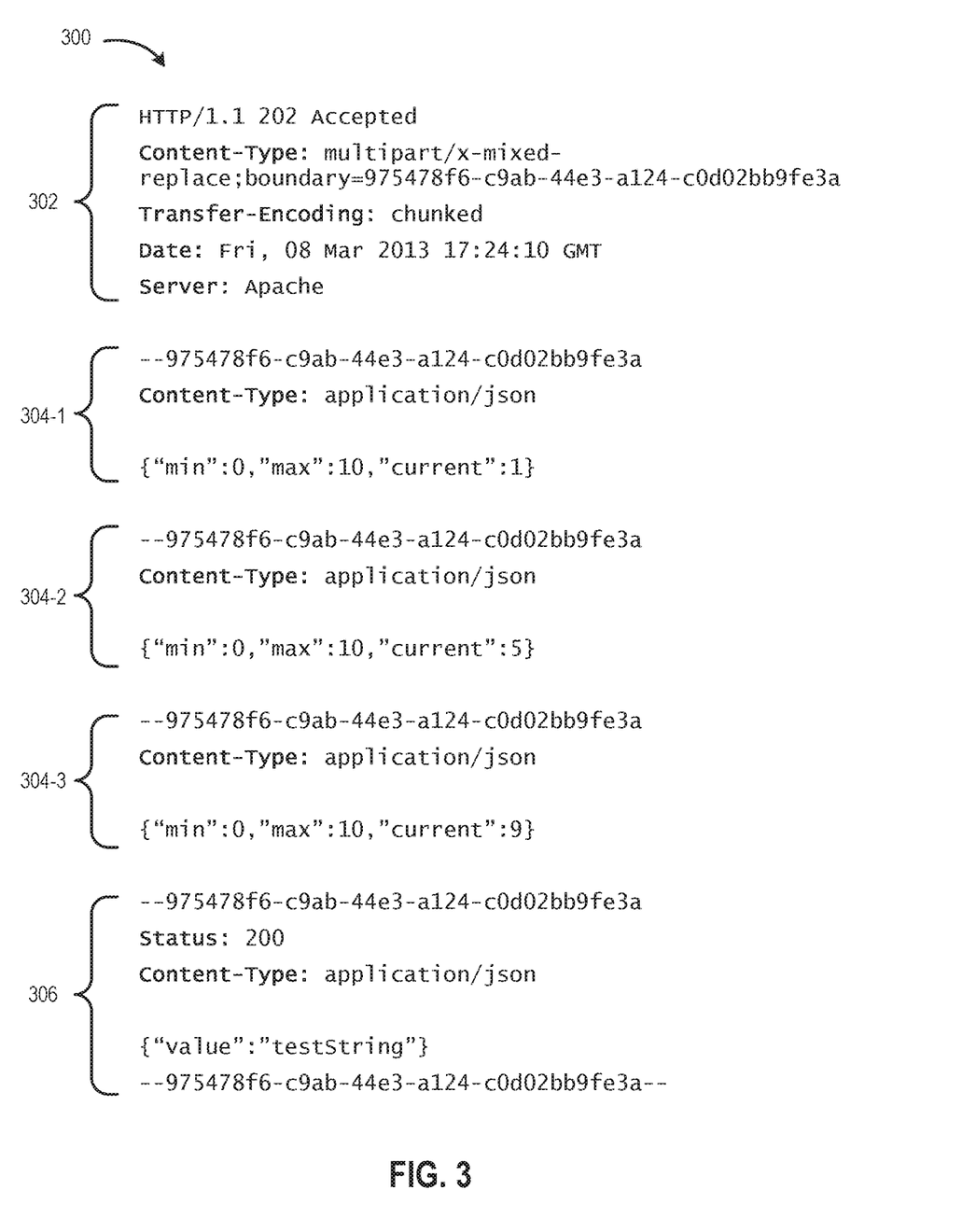
FIG. 3 shows an example HTTP response in response to an HTTP request invoking an API operation with progress updates.

FIG. 3 shows an example HTTP response 300 in response to an HTTP request invoking an API operation with progress updates. With respect to FIG. 3, the terms "client" and "server" are used to represent the consumer of the HTTP response and the originator of the HTTP response, respectively. In the example of FIG. 1, cloud manager 132 is the client and cloud director 152 is the server. Further, HTTP response 300 is part of an HTTP session that includes the HTTP response and an HTTP request (e.g., an HTTP request 200A or 200B as described above).

HTTP response 300 includes a first part 302, at least one additional part 304 (e.g., additional parts 304-1 through 304-3 are shown in the example), and a final part 306. The server sends first part 302 of HTTP response 300 to the client in response to the HTTP request. The status line of HTTP response 300 is provided in first part 302 specifies a status code of "202 Accepted" to indicate that the HTTP request has been received and not yet processed. First part 302 of HTTP response 300 also includes headers "Content-Type", "Transfer-Encoding", "Date", and "Server", although different configurations of headers can be used. The "Content-Type" header specifies that the response conforms to a MIME-type of "multipart/x-mixed-replace" having a boundary of a randomly generated number (e.g., "-975478f6-c9ab-44e3-a124-c0d02bb9fe3a"). The "Transfer-Encoding" header specifies that returned data is "chunked". The "Date" header specifies an example date of "Fri, 8 Mar. 2013 17:24:10 GMT". The "Server" header specifies an example web-server of "Apache".

After sending first part 302 of HTTP response 300, the server begins execution of the requested API operation. While the requested API operation is performed, the server sends additional part(s) 304 of HTTP response 300 to the client. The server can send additional part(s) 304 at any time while the requested API operation is performed (e.g., periodically or aperiodically). For example, the requested API operation can include a plurality of distinct operations and the server can send a progress update in an additional part 304 after completion of each operation. In another example, the server can track an estimated time to complete the requested API and can send progress update(s) in additional part(s) 304 based on the estimated time to completion. In another example, when the requested operation updates the state of an entity, the entity may have a special "Status" attribute which the server track and periodically report to the client in a form of progress update until the operation is completed. In general, the server can track progress of the requested API, which can depend on the type of the requested API. Each of additional part(s) 304 includes a message body that specifies an indication of progress of the requested API operation in a format specified by the client in the HTTP request (e.g., JSON, XML, etc.). Each of additional part(s) 304 can include a header "Content-Type" that specifies the content-type of the message body (e.g., "application/json" in the present example). In the present example, the JSON content in the message body of each of the additional part(s) 304 indicates that the minimum progress corresponds to "0", the maximum progress corresponds to "10", and the current progress corresponds to some number between 0 and 10. In the example, the current progress is "1" in additional part 304-1 (e.g., the API operation is 10% complete), the current progress is "5" in additional part 304-2 (e.g., the API operation is 50% complete), and the current progress is "9" in additional part 304-3 (e.g., the API operation is 90% complete). The additional part(s) 304 can include additional headers in various embodiments. The server can determine the current progress as described above (e.g., by tracking completion of particular operations, by tracking estimated time to completion, and the like.). In accordance with the MIME-type "multipart/x-mixed-replace", additional part(s) 304 are separated from each other and from first part 302 and final part 306 using the specified boundary of "975478f6-c9ab-44e3-a124-c0d02bb9fe3 a".

When the requested API operation is complete, the server sends final part 306 to the client. Final part 306 of HTTP response 300 includes a message body specifying a result of the API operation in a formed specified by the client in the HTTP request (e.g., JSON, XML, etc.). Final part 306 can include a header "Content-Type" specifying the content-type of the message body (e.g., "application/json" in the present example). In the present example, a "value" of "testString" is returned in the message body. In embodiments, final part 306 can include a custom header to indicate the overall status of HTTP response 300. In the present example, final part 306 includes a header "Status" indicating that the HTTP status is "200" (e.g., OK).

The final response sent by the server can indicate success or error. For example, to indicate success, the server can include the following in final part 306 with a status from the 2XX family:

```
......
--975478f6-c9ab-44e3-a124-c0d02bb9fe3a
Status: 200
Content-type: application/json
{"value":"testStringWithProgressUpdates"}
--975478f6-c9ab-44e3-a124-c0d02bb9fe3a--
```

To indicate an error, the server can include the following in final part 306 with a status from the 4XX or 5XX family:

```
...
--975478f6-c9ab-88e3-a124-c0d02bb9fe8a
Status: 500
Content-type: application/json
{
"name":"com.vmware.vapi.std.errors.internal_server_error"
}
--975478f6-c9ab-88e3-a124-c0d02bb9fe8a—
```

Of course, these are just some examples of final part 306.

The specific headers, content-types, boundary, and the like shown in FIG. 3 are examples and can include other values. In general, HTTP response 300 can include multiple parts that acknowledge the request, provide progress update(s), and provide a result of the API operation.

Figure 4:
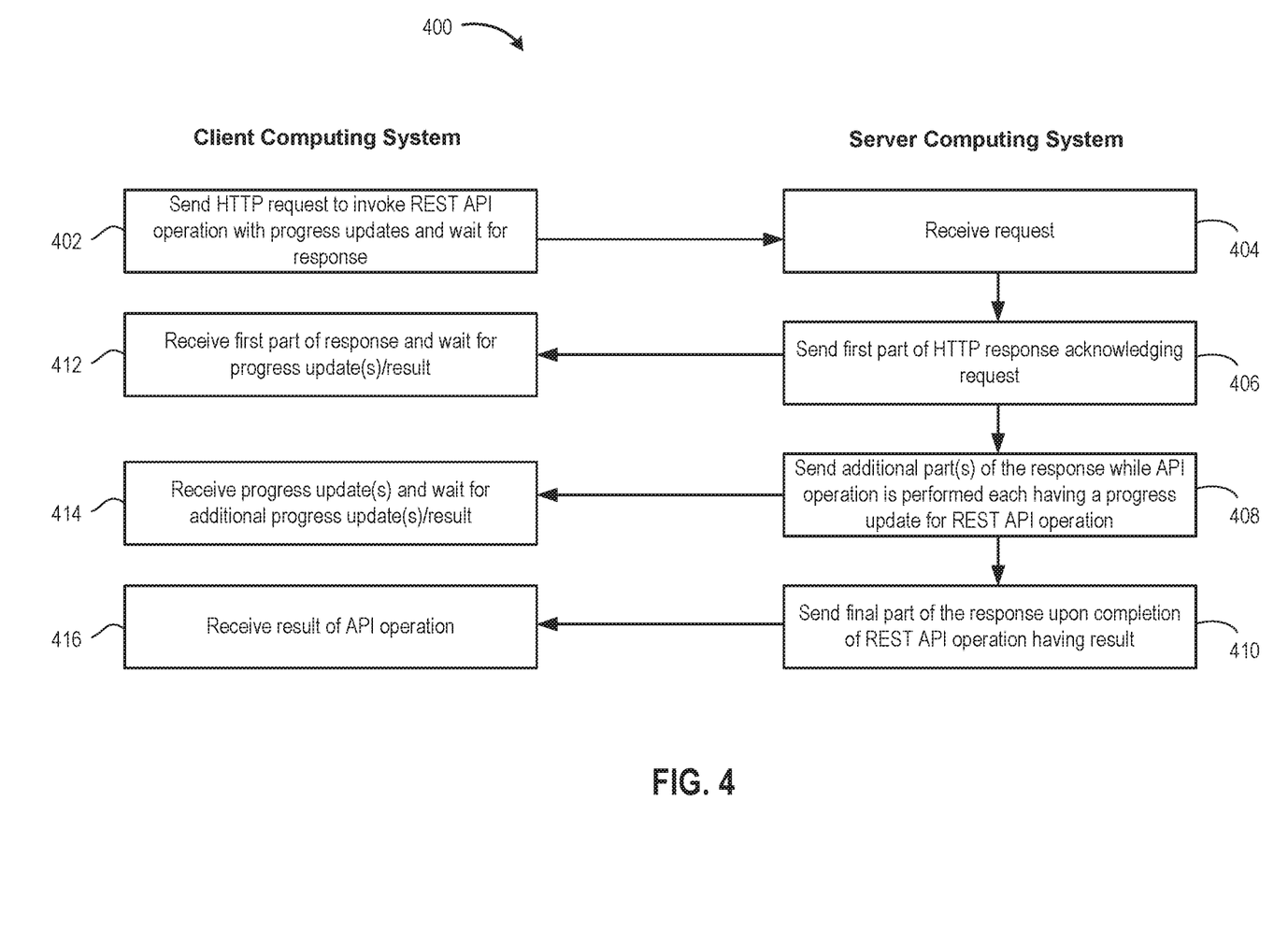
FIG. 4 is a flow diagram showing a method of requesting and performing a REST API operation according to embodiments of the present disclosure.

FIG. 4 is a flow diagram showing a method 400 of requesting and performing a REST API operation according to embodiments of the present disclosure. Method 400 can be performed by a client computing system (e.g., client computing system 102 having cloud manager 132) and a server computing system (e.g., cloud director 152 in cloud computing system 150). The server computing system includes a REST API (e.g., REST API 192) having a plurality of API operations that can be invoked by the client computing system. Method 400 begins at step 402, where the client computing system sends an HTTP request to invoke a REST API operation with progress updates and waits for a response from the server computing system. At step 404, the server computing system receives the HTTP request. At step 406, the server computing system sends a first part of an HTTP response to the client computing system acknowledging the request. At step 412, the client computing system receives the first part of the response and waits for progress update(s) and the result. At step 408, the server computing system sends additional part(s) of the HTTP response to the client computing system while the API operation is being performed. Each of the additional part(s) includes a progress update for the API operation. At step 414, the client computing system receives the progress update(s) from the server computing system and waits for additional progress update(s) and the result. At step 410, the server computing system sends a final part of the HTTP response upon completion of the API operation that includes the result. At step 416, the client computing system 102 receives the result of the API operation.

Figure 5:
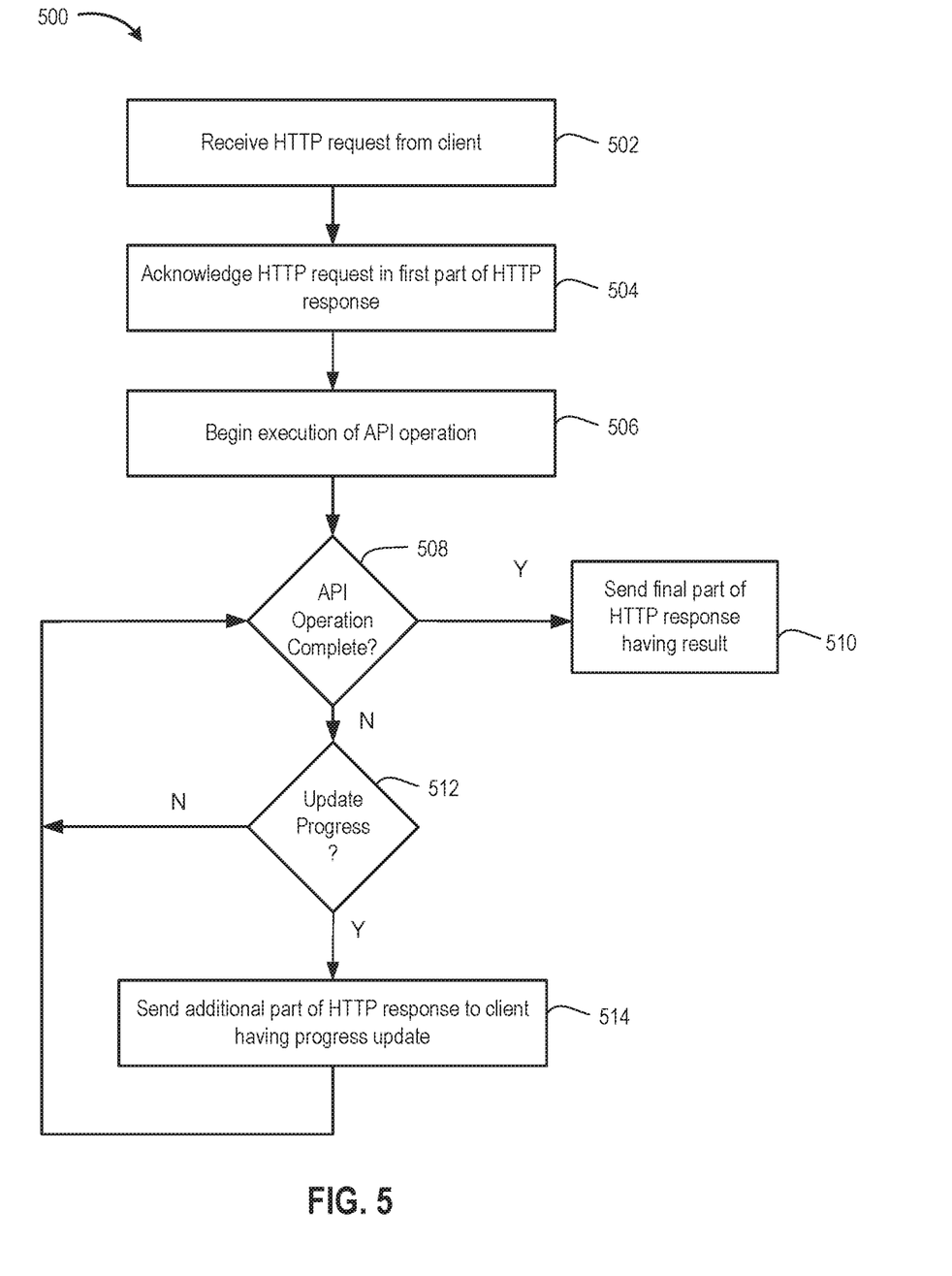
FIG. 5 is a flow diagram depicting a method of performing a REST API operation at a server computing system according to embodiments.

FIG. 5 is a flow diagram depicting a method 500 of performing a REST API operation at a server computing system according to embodiments. Method 500 can be performed by a server computing system (e.g., cloud director 152 in cloud computing system 150). Instructions for performing method 500 can be included in a REST API, in a web server, in another application, or some combination thereof residing on the server computing system. For example, in cloud computing system 150, web server 194 can interact with REST API 192 to perform method 500. Web server 194 can receive HTTP requests from a client, invoke API operations in REST API 192 with parametric input indicating the need for progress updates, receive progress updates from API operations, and provide a multipart HTTP response to the client. An API operation can provide progress updates to be sent to client periodically or aperiodically.

Method 500 begins at step 502, where the server computing system receives an HTTP request from a client (e.g., using web server 194). At step 504, the server computing system acknowledges the HTTP request in a first part of an HTTP response (e.g., using web server 194). At step 506, the server computing system begins execution of the API operation invoked by the HTTP request (e.g., an API operation in REST API 192). At step 508, the server computing system determines progress of the API operation (e.g., a progress update provided an API operation in REST API 192). If the API operation is complete, method 500 proceeds to step 510, where the server computing system sends a final part of the HTTP response having a result of the API operation (e.g., using web server 194 after obtain the result from the API operation). If the API operation is not complete at step 508, method 500 proceeds to step 512. At step 512, the server computing system determines whether to send a progress update to the client (e.g., the API operation determines whether to provide a progress update for transmission to the client using web server 194). If not, method 500 returns to step 508. Otherwise, method 500 proceeds to step 514, where the server computing system sends an additional part of the HTTP response to the client having a progress update (e.g., using web server 194 after receiving a progress update from the API operation). Method 500 returns to step 508 from step 514.

Streaming progress updates and results of representational state transfer (REST) application programming interface (API) operations has been described. In various embodiments, a client can submit a request for progress updates along with an HTTP request invoking a REST API operation of a server. The server sends an acknowledgment, progress update(s), and a result in a multipart HTTP response. The progress update(s) are streamed to the client while the API operation is being performed using part(s) of the HTTP response. In this manner, the techniques described herein improve the functionality of both the client computing system that invokes the REST API operations and the server computing system that executes the REST API operations. For the client computing system, the progress updates allow for computation and tracking of an estimated time of completion and optimization of processes based on the estimated time of completion. For example, client computing system can perform others tasks and coordinate their completion with estimated completion of the API operation. For the server computing system, the progress updates allow the server computing system to optimize execution of the API operation without constraints of expected time of completion and without receiving repeated polling requests from the client computing system. Furthermore, the techniques described herein improve the technology of a REST architecture having a client invoking API operations on a server. The REST architecture is improved in that the client does not have to continuously poll the server to obtain status updates, and the server can optimize execution of the API operations without constraints imposed by expected time of completion or handling progress requests from the client.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of performing a representational state transfer (REST) application programming interface (API) operation at a server computing system, comprising:
  receiving a request of a hypertext transfer protocol (HTTP) session from a client computing system, the request requesting performance of the REST API operation and issuance of progress updates associated with the REST API operation;
  sending to the client, in response to the request requesting issuance of progress updates:
    a first part of a response of the HTTP session to the client computing system, the first part of the response acknowledging the request; and
    while the REST API operation is performed, a plurality of progress updates associated with the REST API operation, the plurality of progress updates comprising additional parts of the response of the HTTP session to the client computing system, wherein the plurality of progress updates are sent to client without receiving any further requests from the client requesting issuance of progress updates associated with the REST API operation; and
  sending, upon completion of the REST API operation, a final part of the response to the client computing system having a result of the REST API operation.

2. The method of claim 1, wherein the request comprises an HTTP method having an accept header requesting the issuance of progress updates.

3. The method of claim 2, wherein the accept header specifies a multi-purpose internet mail extensions (MIME) content type of multipart/x-mixed-replace to request the issuance of progress updates.

4. The method of claim 1, wherein the request comprises an HTTP GET method having a uniform resource identifier (URI) requesting the issuance of progress updates.

5. The method of claim 4, wherein the URI includes a query parameter to request the issuance of progress updates.

6. The method of claim 1, wherein a status line of the response includes a "202 accepted" status code and wherein the final part of the response includes a custom header having a final status code for the response.

7. The method of claim 1, wherein each of the additional parts of the response includes a content-type header specifying a content-type and a message body specifying content formatted in accordance with the content-type and including a progress update.

8. A computing system, comprising:
  a memory configured with a representational state transfer (REST) application programming interface (API) and instructions; and
  a processor, coupled to the memory, configured to execute the instructions to:
    receive a request of a hypertext transfer protocol (HTTP) session from a client, the request requesting performance of a REST API operation in the REST API and issuance of progress updates associated with the REST API operation;
    send to the client, in response to the request requesting issuance of progress updates:
      a first part of a response of the HTTP session to the client, the first part of the response acknowledging the request; and
      while the REST API operation is performed, a plurality of progress updates associated with the REST API operation, the plurality of progress updates comprising additional parts of the response of the HTTP session to the client, wherein the plurality of progress updates are sent to client without receiving any further requests from the client requesting issuance of progress updates associated with the REST API operation; and
    send, upon completion of the REST API operation, a final part of the response to the client having a result of the REST API operation.

9. The computing system of claim 8, wherein the request comprises an HTTP method having an accept header requesting the issuance of progress updates.

10. The computing system of claim 9, wherein the accept header specifies a multi-purpose internet mail extensions (MIME) content type of multipart/x-mixed-replace to request the issuance of progress updates.

11. The computing system of claim 8, wherein the request comprises an HTTP GET method having a uniform resource identifier (URI) requesting the issuance of progress updates.

12. The computing system of claim 11, wherein the URI includes a query parameter to request the issuance of progress updates.

13. The computing system of claim 8, wherein a status line of the response includes a "202 accepted" status code and wherein the final part of the response includes a custom header having a final status code for the response.

14. The computing system of claim 8, wherein each of the additional parts of the response includes a content-type header specifying a content-type and a message body specifying content formatted in accordance with the content-type and including a progress update.

15. A non-transitory computer readable medium having instructions stored thereon that when executed by a processor cause the processor to perform a method of performing a representational state transfer (REST) application programming interface (API) operation at a server computing system, comprising:
  receiving a request of a hypertext transfer protocol (HTTP) session from a client computing system, the request requesting performance of the REST API operation and issuance of progress updates associated with the REST API operation;
  sending to the client, in response to the request requesting issuance of progress updates:
    a first part of a response of the HTTP session to the client computing system, the first part of the response acknowledging the request; and
    while the REST API operation is performed, a plurality of progress updates associated with the REST API operation, the plurality of progress updates comprising additional parts of the response of the HTTP session to the client computing system, wherein the plurality of progress updates are sent to client without receiving any further requests from the client requesting issuance of progress updates associated with the REST API operation; and
  sending, upon completion of the REST API operation, a final part of the response to the client computing system having a result of the REST API operation.

16. The non-transitory computer readable medium of claim 15, wherein the request comprises an HTTP method having an accept header requesting the issuance of progress updates.

17. The non-transitory computer readable medium of claim 16, wherein the accept header specifies a multi-purpose internet mail extensions (MIME) content type of multipart/x-mixed-replace to request the issuance of progress updates.

18. The non-transitory computer readable medium of claim 15, wherein the request comprises an HTTP GET method having a uniform resource identifier (URI) requesting the issuance of progress updates.

19. The non-transitory computer readable medium of claim 18, wherein the URI includes a query parameter to request the issuance of progress updates.

20. The non-transitory computer readable medium of claim 15, wherein each of the additional parts of the response includes a content-type header specifying a content-type and a message body specifying content formatted in accordance with the content-type and including a progress update.

\* \* \* \* \*